United States Patent
Keating et al.

(10) Patent No.: US 11,480,669 B2
(45) Date of Patent: Oct. 25, 2022

(54) METHOD FOR SRS FOR POSITIONING RESOURCE OVERHEAD REDUCTION IN MULTI-RTT

(71) Applicant: Nokia Technologies Oy, Espoo (FI)

(72) Inventors: Ryan Keating, Chicago, IL (US); Oana-Elena Barbu, Aalborg (DK); Johannes Harrebek, Aalborg (DK); Benny Vejlgaard, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 113 days.

(21) Appl. No.: 16/876,686

(22) Filed: May 18, 2020

(65) Prior Publication Data

US 2021/0356581 A1 Nov. 18, 2021

(51) Int. Cl.
| | | |
|---|---|---|
| *G01S 13/76* | (2006.01) | |
| *G01S 13/87* | (2006.01) | |
| *H04W 64/00* | (2009.01) | |
| *H04B 7/06* | (2006.01) | |

(52) U.S. Cl.
CPC .......... *G01S 13/762* (2013.01); *G01S 13/765* (2013.01); *G01S 13/878* (2013.01); *H04B 7/0695* (2013.01); *H04W 64/00* (2013.01)

(58) Field of Classification Search
CPC .... G01S 13/762; G01S 13/765; G01S 13/878; H04W 64/00; H04W 72/046; H04W 72/04; H04W 72/042; H04W 36/00
See application file for complete search history.

(56) References Cited

U.S. PATENT DOCUMENTS

| | | | |
|---|---|---|---|
| 9,507,007 B2 | 11/2016 | Markhovsky et al. | |
| 2018/0249453 A1* | 8/2018 | Nagaraja | H04B 7/0617 |
| 2019/0361111 A1 | 11/2019 | Sadiq et al. | |
| 2021/0076395 A1* | 3/2021 | Zhou | H04L 27/26025 |
| 2021/0409967 A1* | 12/2021 | Franke | H04W 72/042 |

FOREIGN PATENT DOCUMENTS

| | | |
|---|---|---|
| EP | 2835018 B1 | 12/2007 |
| WO | WO-2014/093400 A1 | 6/2014 |

OTHER PUBLICATIONS

Amitabha Ghosh, Andreas Maeder, Matthew Baker, and Devaki Chandramouli "5G Evolution: A View on 5G Cellular Technology Beyond 3GPP Release 15" IEEE Acess. Received Aug. 26, 2019, accepted Sep. 1, 2019, date of publication Sep. 6, 2019, date of current version Sep. 19, 2019.

* cited by examiner

*Primary Examiner* — Umair Ahsan
(74) *Attorney, Agent, or Firm* — Joseph C. Drish; Harrington & Smith

(57) ABSTRACT

Methods, apparatuses, and computer programs are provided for SRS for positioning resource overhead reduction in multi-RTT. A method for a UE includes receiving an initial configuration of a plurality of sounding reference signal for positioning resources; measuring a downlink positioning reference signal received from one or more cells; determining one or more transmission beams based on reception beams used for receipt of the downlink positioning reference signal from the one or more cells; wherein the determining of the one or more transmission beams comprises a reduction of at least one beam resource associated with a sounding reference signal for positioning; and transmitting an updated sounding reference signal for positioning configuration with information about the determined one or more transmission beams. Methods are also provided for a radio node and for an LMF.

19 Claims, 11 Drawing Sheets

METHOD FOR SRS FOR POSITIONING RESOURCE OVERHEAD REDUCTION IN MULTI-RTT

TECHNICAL FIELD

The examples and non-limiting embodiments relate generally to communications and, more particularly, to methods for SRS for positioning resource overhead reduction in multi-RTT.

BACKGROUND

It is known to provide systems for position estimation, such as a global positioning system (GPS).

SUMMARY

The following summary is merely intended to be an example. The summary is not intended to limit the scope of the claims.

An example method includes receiving an initial configuration of a plurality of sounding reference signal for positioning resources; measuring a downlink positioning reference signal received from one or more cells; determining one or more transmission beams based on reception beams used for receipt of the downlink positioning reference signal from the one or more cells; wherein the determining of the one or more transmission beams comprises a reduction of at least one beam resource associated with a sounding reference signal for positioning; and transmitting an updated sounding reference signal for positioning configuration with information about the determined one or more transmission beams.

Another example method includes transmitting a downlink positioning reference signal to be used in a positioning method involving a sounding reference signal for positioning configuration; and receiving an updated sounding reference signal for positioning configuration, wherein the updated sounding reference signal for positioning configuration is based on a reduction of at least one beam resource.

Another example method includes providing a multi-cell round trip time positioning request for one or more cells; receiving an initial sounding reference signal for positioning configuration based on the multi-cell round trip time positioning request; receiving an updated sounding reference signal for positioning configuration, wherein the updated sounding reference signal for positioning configuration is based on a reduction of at least one beam resource; and transmitting the updated sounding reference signal for positioning configuration to at least one radio node.

An example apparatus includes at least one processor; and at least one non-transitory memory including computer program code; wherein the at least one memory and the computer program code are configured to, with the at least one processor, cause the apparatus at least to perform: receive an initial configuration of a plurality of sounding reference signal for positioning resources; measure a downlink positioning reference signal received from one or more cells; determine one or more transmission beams based on reception beams used for receipt of the downlink positioning reference signal from the one or more cells; wherein the determining of the one or more transmission beams comprises a reduction of at least one beam resource associated with a sounding reference signal for positioning; and transmit an updated sounding reference signal for positioning configuration with information about the determined one or more transmission beams.

Another example apparatus includes at least one processor; and at least one non-transitory memory including computer program code; wherein the at least one memory and the computer program code are configured to, with the at least one processor, cause the apparatus at least to perform: transmit a downlink positioning reference signal to be used in a positioning method involving a sounding reference signal for positioning configuration; and receive an updated sounding reference signal for positioning configuration, wherein the updated sounding reference signal for positioning configuration is based on a reduction of at least one beam resource.

Another example apparatus includes at least one processor; and at least one non-transitory memory including computer program code; wherein the at least one memory and the computer program code are configured to, with the at least one processor, cause the apparatus at least to perform: provide a multi-cell round trip time positioning request for one or more cells; receive an initial sounding reference signal for positioning configuration based on the multi-cell round trip time positioning request; receive an updated sounding reference signal for positioning configuration, wherein the updated sounding reference signal for positioning configuration is based on a reduction of at least one beam resource; and transmit the updated sounding reference signal for positioning configuration to at least one radio node.

An example non-transitory program storage device readable by a machine, tangibly embodying a program of instructions executable by the machine for performing operations is provided, the operations comprising: receiving an initial configuration of a plurality of sounding reference signal for positioning resources; measuring a downlink positioning reference signal received from one or more cells; determining one or more transmission beams based on reception beams used for receipt of the downlink positioning reference signal from the one or more cells; wherein the determining of the one or more transmission beams comprises a reduction of at least one beam resource associated with a sounding reference signal for positioning; and transmitting an updated sounding reference signal for positioning configuration with information about the determined one or more transmission beams.

Another example non-transitory program storage device readable by a machine, tangibly embodying a program of instructions executable by the machine for performing operations is provided, the operations comprising: transmitting a downlink positioning reference signal to be used in a positioning method involving a sounding reference signal for positioning configuration; and receiving an updated sounding reference signal for positioning configuration, wherein the updated sounding reference signal for positioning configuration is based on a reduction of at least one beam resource.

Another non-transitory program storage device readable by a machine, tangibly embodying a program of instructions executable by the machine for performing operations is provided, the operations comprising: providing a multi-cell round trip time positioning request for one or more cells; receiving an initial sounding reference signal for positioning configuration based on the multi-cell round trip time positioning request; receiving an updated sounding reference signal for positioning configuration, wherein the updated sounding reference signal for positioning configuration is based on a reduction of at least one beam resource; and transmitting the updated sounding reference signal for positioning configuration to at least one radio node.

BRIEF DESCRIPTION OF THE DRAWINGS

The foregoing aspects and other features are explained in the following description, taken in connection with the accompanying drawings, wherein:

FIG. 5 depicts an example of beam overlap.

DETAILED DESCRIPTION OF EXAMPLE EMBODIMENTS

Figure 1:
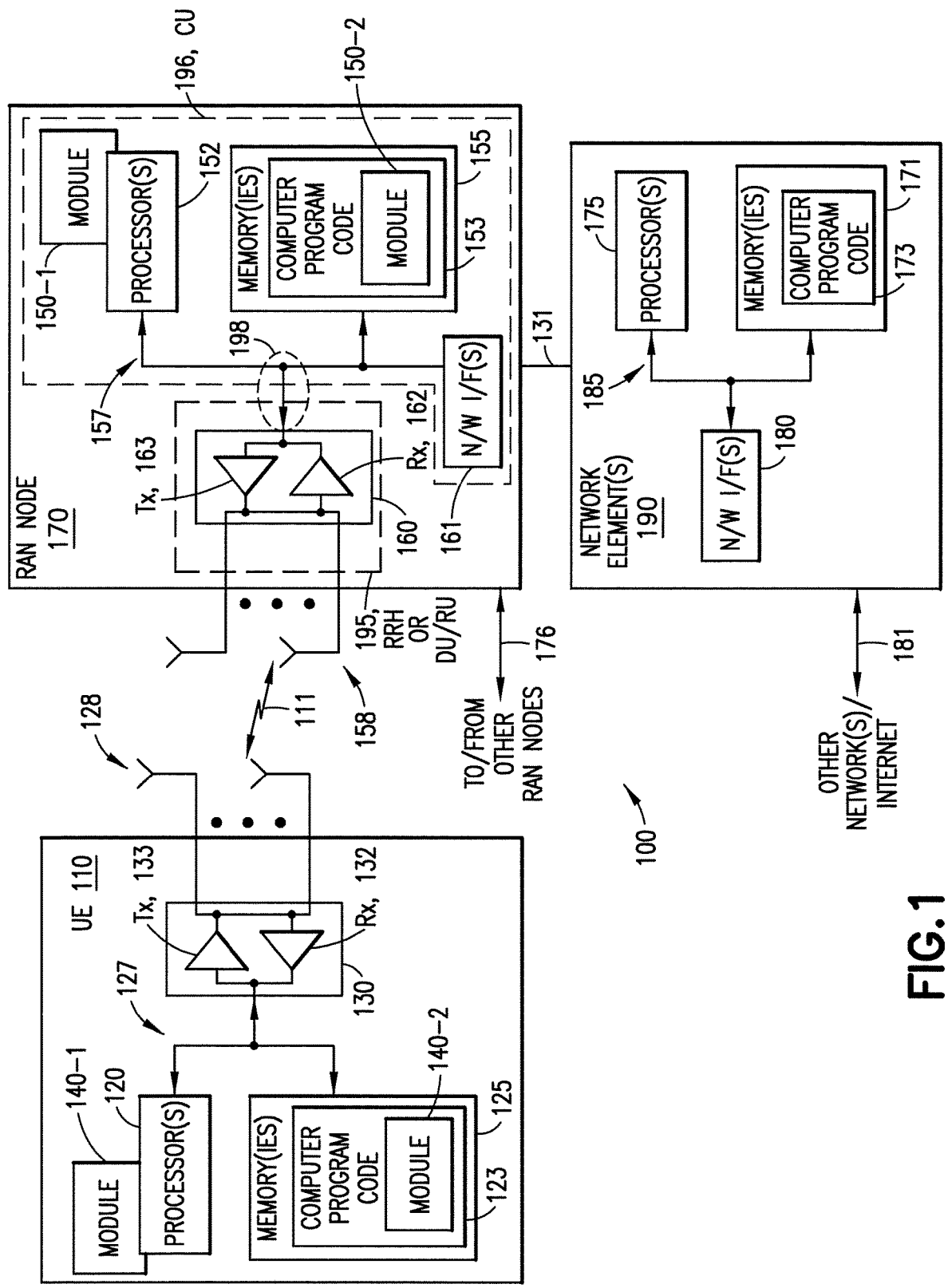
FIG. 1 is a block diagram of one possible and non-limiting system in which the example embodiments may be practiced.

When more than one drawing reference numeral is used within this description with "/", and in general as used within this description, the "/" may be interpreted as either "or", "and", or "both".

The following acronyms and abbreviations that may be found in the specification and/or the drawing figures are defined as follows:

3GPP third generation partnership project
4G fourth generation
5G fifth generation
5GC 5G core network
AMF access and mobility management function
Ant antenna
AoA Angle of Arrival
BF Beamforming
CR change request
CU central unit or centralized unit
DL downlink
DL-AoD downlink angle of departure
DL PRS Downlink Positioning Reference Signal
DL-TDOA downlink time difference of arrival
DU distributed unit
DSP digital signal processor
EKF extended Kalman filtering
eNB evolved Node B (e.g., an LTE base station)
EN-DC E-UTRA-NR dual connectivity
en-gNB node providing NR user plane and control plane protocol terminations towards the UE, and acting as a secondary node in EN-DC
E-UTRA evolved universal terrestrial radio access, i.e., the LTE radio access technology
F1 control interface between CU and DU
FR1 and FR2 frequency range 1 and frequency range 2
gNB base station for 5G/NR, i.e., a node providing NR user plane and control plane protocol terminations towards the UE, and connected via the NG interface to the 5GC
GPS global positioning system
I/F interface
Id or ID identifier
incl. including
I/O input/output
IoT Internet of Things
(I)IoT Industrial Internet of Things
LCS Location Service
LMF Location Management Function
LPP LTE Positioning Protocol
LTE long term evolution (4G)
MAC medium access control
MME mobility management entity
Multi-RTT multi-cell round trip time
ng or NG new generation
ng-eNB new generation eNB
NG-RAN new generation radio access network
NN neural network
NR new radio (5G)
NRPPa New Radio Positioning Protocol A
N/W or NW network
PDCP packet data convergence protocol
PHY physical layer
PRS Positioning Reference Signal
PRS-RSRP PRS reference signal received power
R1—3GPP RAN 1
RAN radio access network
RAN1 RAN WG1 or Radio layer 1
RAN2 RAN WG2 or Radio layer 2
RAN3 RAN WG3
RAT radio access technology
Rel—release
RLC radio link control
RP—3GPP RAN
RRC radio resource control
RRH remote radio head
RS reference signal
RSRP Reference Signal Received Power
RTT Round Trip Time
RU radio unit
Rx or RX receiver or interchangeably receive
SDAP service data adaptation protocol
SGW serving gateway
SID Shared Information/Data
SINR Signal-to-interference-plus-noise ratio
SMF session management function
SRS Sounding Reference Signal
SRS-P SRS for positioning
TOA Time of Arrival
TPC transmit power control
TS technical specification
Tx or TX transmitter or interchangeably transmit
UE user equipment (e.g., a wireless, typically mobile device)
UL uplink
UL-AoA uplink angle of arrival UL-TDOA uplink time difference of arrival
UPF user plane function
WG working group
WID work item description Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111. The modules 140-1 and 140-2 may be configured to implement the functionality of the UE as described herein.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

A Rel-16 work item [RP-190752, "New WID: NR Positioning Support"] was conducted in 3GPP for native positioning support in New Radio (NR). As the result of that work, the following positioning solutions are specified for NR Rel-16 (note that RAN1 has completed its work while RAN2/3 are finalizing the signaling details):
  Downlink Time Difference of Arrival (DL-TDOA)
  Uplink Time Difference of Arrival (UL-TDOA)
  Downlink Angle of Departure (DL-AoD)
  Uplink Angle of Arrival (UL-AoA)
  Multi-cell Round Trip Time (Multi-RTT)

The work is to specify solutions to enable RAT dependent (for both FR1 and FR2) and RAT independent NR positioning techniques. FR1 is below 6 GHz and FR2 is in the range 24.25 GHz to 52.6 GHz. In the DL a new positioning reference signal (PRS) was introduced and in the UL a new SRS for positioning (SRS-P) was introduced [R1-1913661, Positioning CR to TS 38.211].

In release 17, there will be further work on NR positioning with the following main target [RP-193237, New SID for Positioning Enhancements]:
  "Study enhancements and solutions necessary to support the high accuracy (horizontal and vertical), low latency, network efficiency (scalability, RS overhead, etc.), and device efficiency (power consumption, complexity, etc.) requirements for commercial uses cases (incl. general commercial use cases and specifically (I)IoT use cases"

Figure 2:
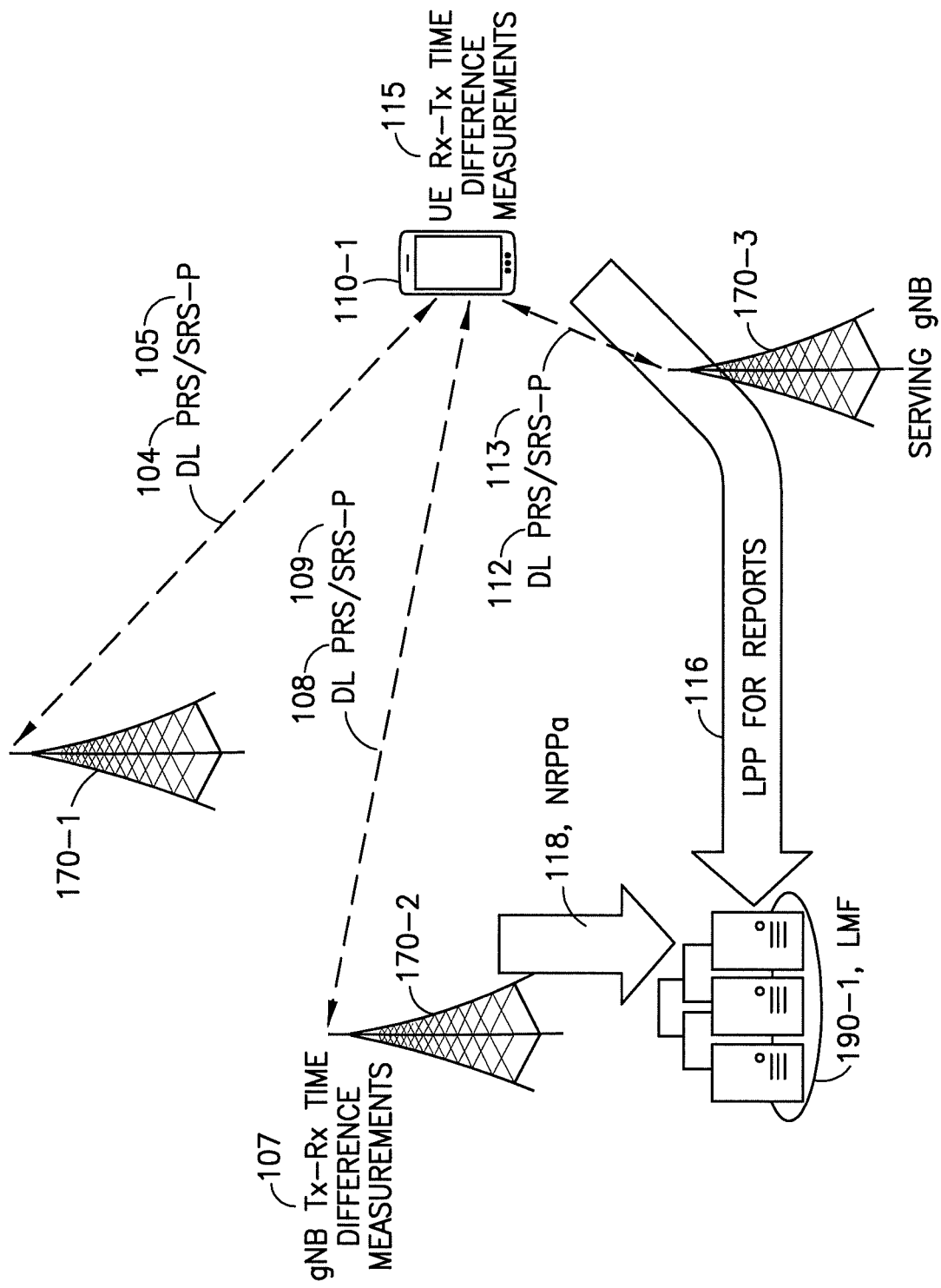
FIG. 2 depicts an overview of a multi-RTT technique.

Multi-RTT is one of the Rel-16 methods specified and relies on both UL and DL measurements/signals. FIG. 2 shows an example overview of the technique. At a high level the method works by multiple gNBs 170-1/170-2/170-3 transmitting the DL PRS 104/108/112 to the UE 110-1 and then the UE 110-1 transmits the SRS-P 105/109/113 to the gNBs 170-1/170-2/170-3. The UE 110-1 measures 115 the UE Rx-Tx time difference for each cell while each gNB 170-1/170-2/170-3 measures (e.g., 107) the gNB Rx-Tx time difference for the UE 110-1. The measurements are reported 116/118 to the location management function (LMF) 190-1 which can then estimate the RTT to each gNB 170-1/170-2/170-3 from the UE 110-1 and therefore can estimate the position of the UE 110-1. In the example shown in FIG. 2, the UE 110-1 reports measurements over the LTE Positioning Protocol (LPP) 116 and the gNB 170-1/170-2/170-3 reports measurements over New Radio Positioning Protocol A (NRPPa) 118.

Multi-cell RTT is a method for Rel-16 NR positioning which promises high accuracy due to lack of synchronization errors suffered and the wide bandwidth available (better timing measurement accuracy). At FR2 the UE needs to beamform UL transmission and potentially perform TPC towards neighbor cells to close the UL link budget and/or overcome the high pathloss.

To address this problem an enhancement may be made to SRS-P so that spatial relation information (e.g., as parameter spatialRelationInfo) uses neighboring cells RS as the reference. Spatial relations configure the UE to select the RX beam used for receiving the reference RS as the TX beam of the SRS-P. This enables the UE to perform UL beamforming towards neighboring cells for positioning purposes. So, based on receiving multiple DL PRS beams from multiple gNBs, the UE could be configured to transmit using the best beams for multiple cells. However, spatialRelationInfo is selected by the LMF and the LMF needs prior reports of DL PRS-RSRP from the UE in order to know which resources to configure as the spatial relation, but the LMF has no knowledge of which beams the UE may use.

Figure 3:
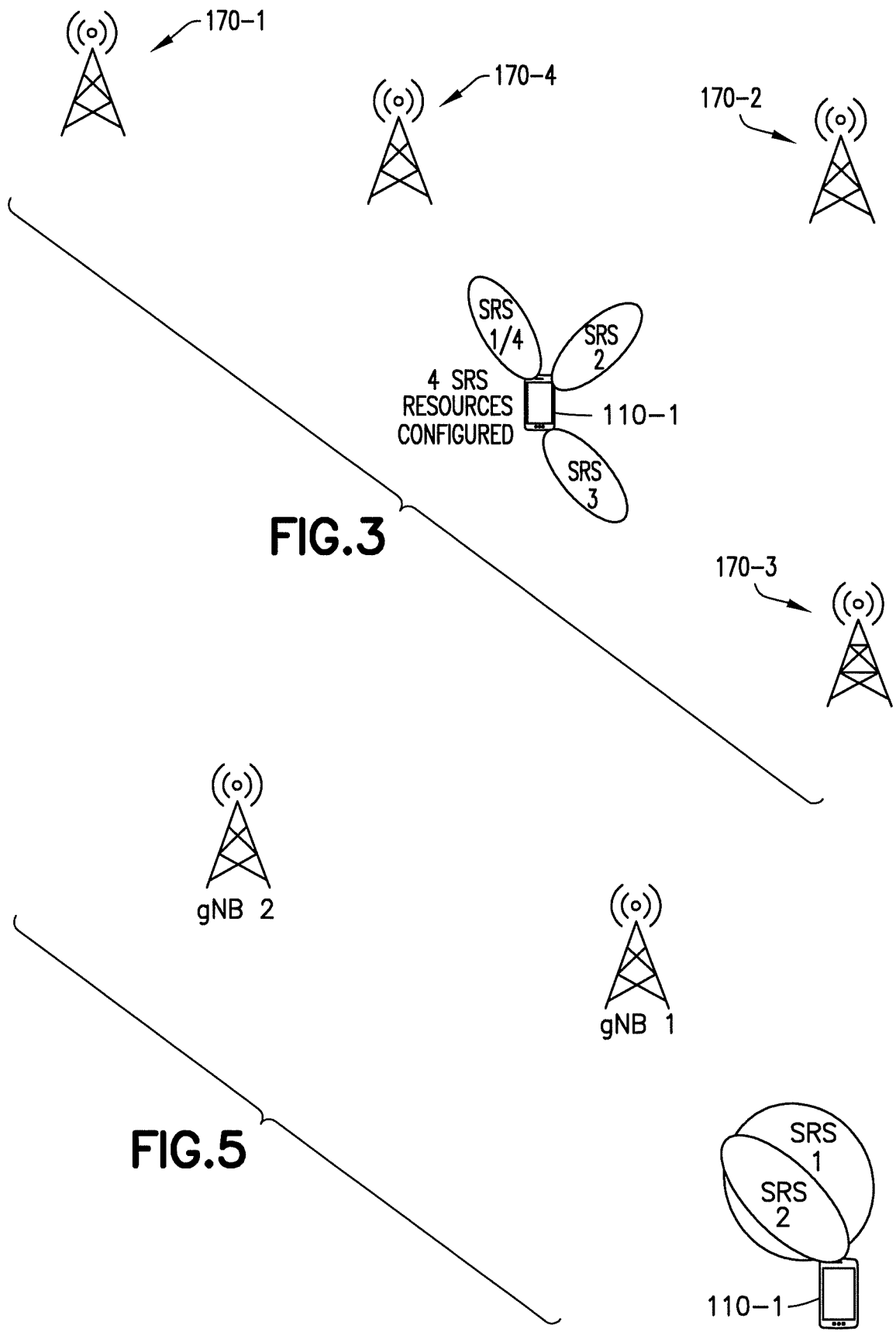
FIG. 3 depicts a SRS-P configuration problem where the same beam is chosen for two transmissions.

In addition, a relatively large number of cells may be involved in multi-RTT for one user (e.g., 12-15 cells). A spatialRelationInfo can be configured for each SRS-P resource such that the UE then transmits 1 SRS-P resource per cell which can be a large overhead. In fact, the UE may even use the same (or similar) RX beam to receive the best DL PRS from multiple cells therefore using the same TX beam on multiple SRS resources which represents wasted overhead and unnecessary power consumption at the UE. FIG. 3 shows an example where the UE 110-1 is configured with 4 spatial relations for 4 SRS resources (SRS 1, SRS 2, SRS 3, and SRS 4) but transmits using the same beam for 2 of those resources (SRS 1 & 4). Shown also in FIG. 3 are base stations 170-1, 170-2, 170-3, and 170-4.

The examples described herein address this overhead problem by minimizing the number of SRS-P resources while preserving transmission towards every cell involved in multi-RTT.

Most prior art is related to selecting the best beam for a serving cell only (e.g., for data purposes) and does not consider the need to transmit in a beamformed manner towards neighboring cells. As discussed previously the enhancement of SRS-P to allow spatial relations to be configured for neighboring cells was introduced in Rel-16. The state of the art from TS 38.214, "Physical layer procedures for data", V16.0.0, 3GPP, clause 6.2.1.4 provides:

"When the SRS is configured by the higher layer parameter [SRS-for-positioning] and if the higher layer parameter spatialRelationInfo contains the ID of a reference 'DL-PRS-ResourceId', the UE shall transmit the target SRS resource with the same spatial domain transmission filter used for the reception of the reference DL PRS."

Configuring a spatialRelationInfo is one way to target every cell for multi-RTT but does not address the problem if multiple resources end up having the same transmit beam on the UE side as described previously. The issue of minimizing the number of SRS-P resources to still reach every cell is addressed by the methods provided and described herein.

Figure 4:
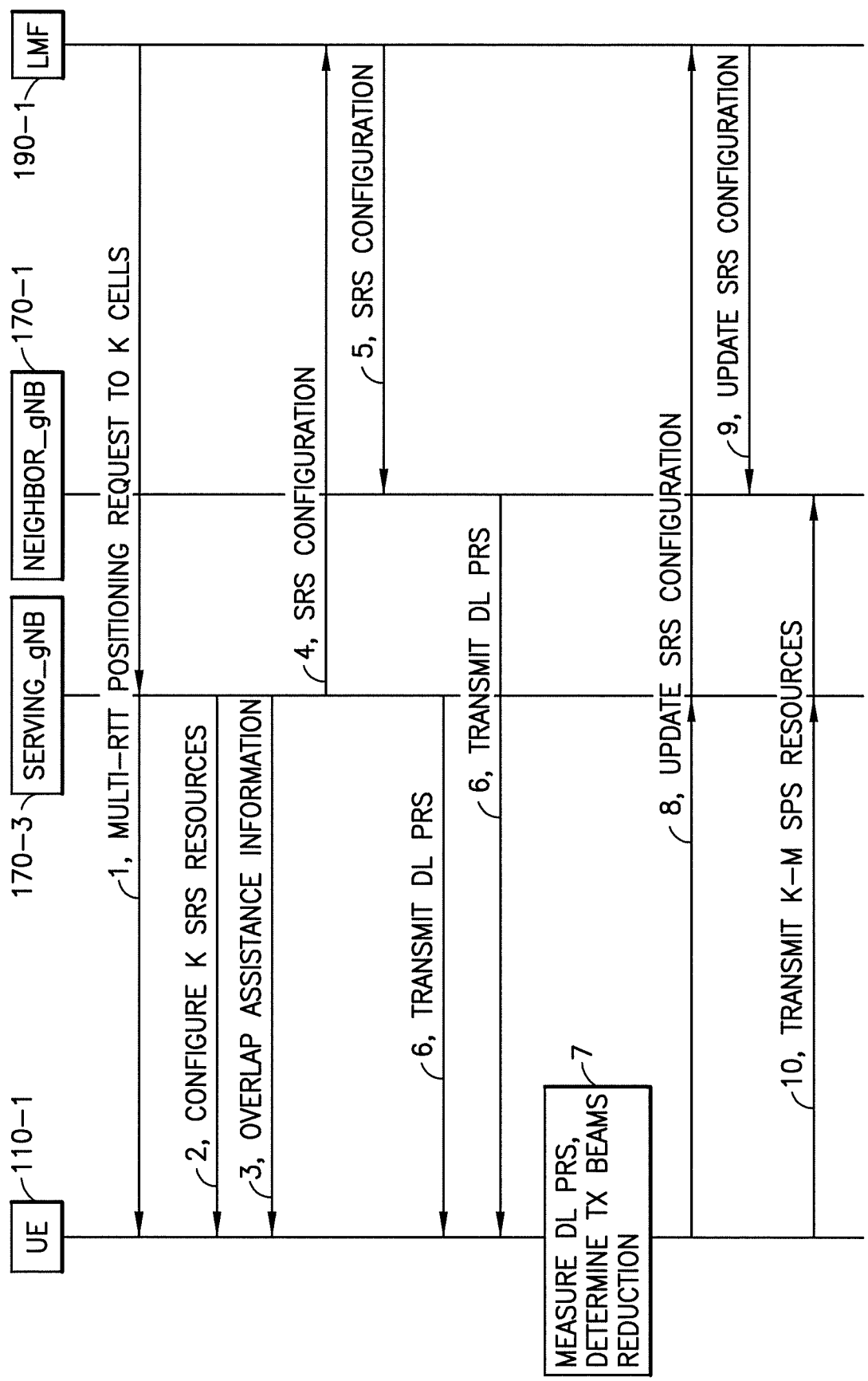
FIG. 4 is a diagram showing an example signaling flow based on the methods described herein.

Accordingly, the examples described herein provide a method for reducing the overhead of SRS-P resources for multi-cell RTT. FIG. 4 shows the overall signaling flow of one example method with the novel steps explained herein. Several aspects and additional detailed embodiments are described.

FIG. 4 depicts UE 110-1, serving gNB 170-3, neighbor gNB 170-1, and LMF 190-1. It should be appreciated that while one neighbor gNB 170-1 is shown in FIG. 4, the signaling shown in FIG. 4 may include transmissions to/from other neighbor gNBs other than neighbor gNB 170-1. Also, while the steps in FIG. 4 are numbered as 1-10, the numbered steps may not in some examples occur in the numerical order as shown in FIG. 4.

In the example shown by FIG. 4, the LMF 190-1 provides, at step 1, a multi-RTT positioning request to K cells to the serving gNB 170-3, which is sent from the LMF 190-1 or the serving gNB 170-3 to the UE 110-1. The UE 110-1 performing multi-cell RTT to K cells is configured with K SRS resources (at step 2) containing configured spatial relation information (assuming DL/UL beam correspondence). In FIG. 4, the serving gNB 170-3 configures K SRS resources at step 2 to the UE 110-1.

At step 3, the serving gNB 170-3 provides overlap assistance information to the UE 110-1. Thus at step 3, the network may signal assistance data to the UE 110-1 to help with selection of overlap (e.g., minimum link budget). Further details on step 3 are described herein.

At step 4, the serving gNB 170-3 provides the SRS configuration to the LMF 190-1. At step 5, the LMF 190-1 provides the SRS configuration to the neighbor gNB 170-1 (there may be one or more neighbor gNB(s)). At step 6, the serving gNB 170-3 and the neighbor gNB 170-1 each transmit the DL PRS to the UE 110-1.

At step 7, the UE 110-1 measures DL PRS from K cells and determines appropriate TX beams based on RX beams used for DL PRS reception. The UE 110-1 may identify the same TX beam for multiple cells which represents overlap in M beams (new UE procedure, 7).

The UE 110-1 may also identify beams which overlap with each other in the spatial domain (e.g., in the case of different beam-widths).

The UE 110-1 may also scan the different UE antenna panels to identify if a shared TX beam is possible to be used for multiple target cells. This can be done using UE DL AoA calculations from the visible gNBs. Based on the AoA a common UE antenna panel may be used to further reduce the TX resources (new UE procedure, 7).

The UE 110-1 informs the network of overlap in M<K TX beams (new step/signaling, 8). The UE 110-1 can indicate which additional cells each K-M resource is targeted towards. This signaling could be a new RRC message or a new LPP message. As is shown by FIG. 4, the UE 110-1 provides such updated SRS configuration at step 8 to the serving gNB 170-3 and to the LMF 190-1.

The LMF 190-1 signals the updated SRS configuration to the gNBs (such as neighbor gNB 170-1) to ensure SRS reception and proper RX beamforming at the gNB (new signaling, 9).

The UE 110-1 transmits K-M SRS for positioning (new step, 10). As is shown by FIG. 4, at step 10, the UE 110-1 transmits K-M SRS resources to the serving gNB 170-3 and to the neighbor gNB 170-1. The UE 110-1 may transmit beam widths in UL different than used for reception in the DL, which is currently mandated by use of spatial relation, as long as the link constraints set in the assistance data are met (new step).

Over time the LMF 190-1 can track the number of SRS resources needed (based on location, mobility, trajectory) to configure the correct number of SRS resources (new step).

Assistance information signaled to the UE for overlap selection (such as at step 3 of FIG. 4) could include parameters for link budget calculation such as beamforming (BF) gain for DL PRS resources. The UE can then estimate the link budget to each gNB as the UE has the received power and as part of the DL PRS configuration has the DL PRS Tx Power.

If the link budget is sufficient then the UE can use a broader beam for transmission to multiple gNBs using a single resource. The LMF could also provide a minimum requested received power for the UE as the threshold to determine if the link budget is sufficient. The UE could also determine this threshold based on local knowledge or an assumption that UL received power needs to be within a defined or specified threshold of the DL received power. This allows the UE to further reduce SRS transmission overhead by selecting beams that are not only equivalent but also overlapping in the spatial domain.

FIG. 5 shows an example of how the overlap could look, depicting UE 110-1, gNB 1, gNB 2, SRS 1, and SRS 2. As shown by FIG. 5, SRS 1 and SRS 2 overlap. To show the overlap, SRS 2 is depicted for illustrative purposes as being "on top of" or "in front of" SRS 1. In FIG. 5, the SRS 2 aimed at gNB 2 could be left not sent as long as the link budget for the farther away gNB is still sufficient using the beam for SRS 1.

As noted within the discussion of FIG. 4, the UE may determine to use UL beams or beam widths different than for reception of the DL RS (in order to take advantage of overlap). The current standard mandates the UE to use the same beam in DL and UL when a spatial relation is configured. However, the network still has control over how the UE is allowed to make this change through the use of the assistance data.

In some examples, it is possible to use gNB assistance information for broadening the UE UL beam based on the link budget evaluation. With reference to the scenario depicted in FIG. 5 and the link budget shown in FIG. 6, the procedure for broadening the UL beam for SRS 1 transmission to both gNB 1 and 2 comprises the following.

Serving gNB 170-3→UE 110-1: The gNB 170-3 requests multi-RTT measurement with 2 SRS resources and provides assistance information including gNB DL power 1002, DL_gNB_Power, gNB UL/DL delta antenna gain 1010, gNB_Ant_Delta_Gain, and UL RSRP minimum target 1004, UL_RSRP_Target.

gNB1&2→UE 110-1: gNB 1 & 2 transmit DL PRS towards UE 110-1.

UE: UE 110-1 measures DL PRS 1 & 2 with gNB 1/2 specific UE DL beam configurations. Based on UE DL beam configurations used (gain and steering angles), the UE evaluates feasibility of transmitting SRS to both gNB 1 and 2 using only one UL beam configuration (gain and steering angle). This may be accomplished by a widening of the UL beam width which again results in lower antenna gain towards the gNBs.

Thus, the UE 110-1 evaluates for each gNB the UL link budget to confirm tolerance to a lower antenna gain using the gNB provided assistance information together with UE local known parameters:

$$DL\_Path\_Loss = DL\_gNB\_Power + DL\_gNB\_Ant\_Gain + DL\_UE\_Ant\_Gain - DL\_RSRP \quad \text{(Equation 1)}$$

$$UL\_Path\_Loss = UL\_UE\_Power + UL\_UE\_Ant\_Gain + UL\_gNB\_Ant\_Gain - UL\_RSRP \quad \text{(Equation 2)}$$

Figure 6:
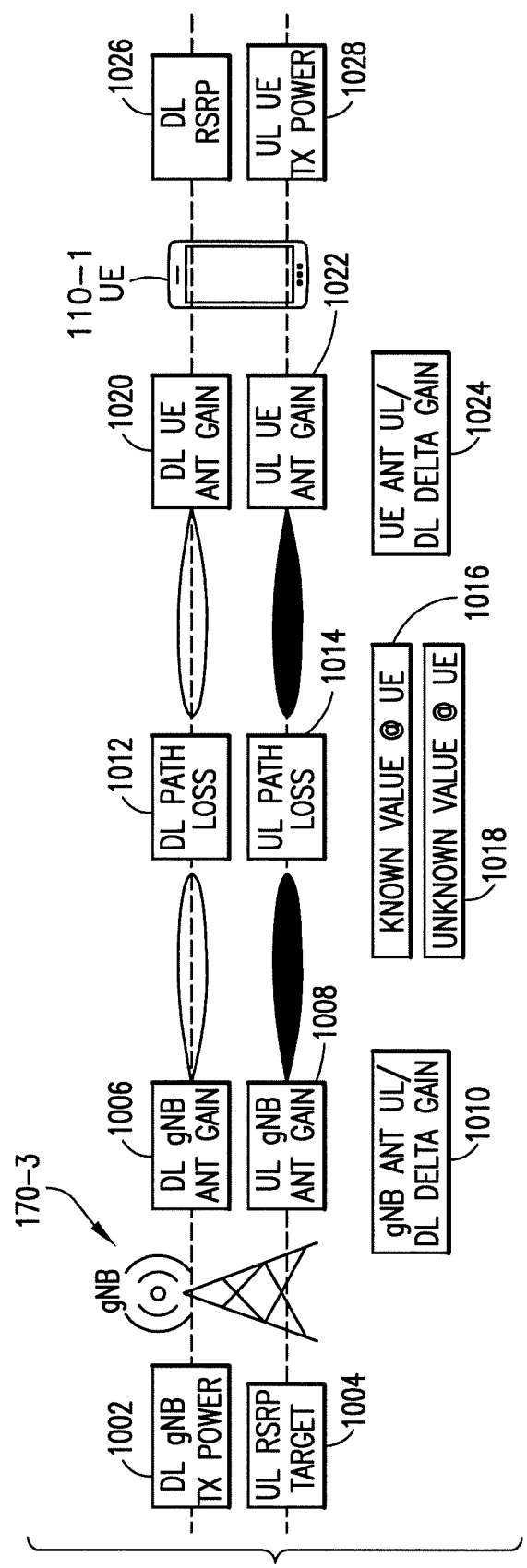
FIG. 6 is an illustration depicting an example of UL and DL link budget assessment.

Reading from left to right, the parameters of Equation 1 represent respectively DL Path Loss 1012, DL gNB TX Power 1002, DL gNB Ant Gain 1006, DL UE Ant Gain 1020, and DL RSRP 1026 of FIG. 6. Reading from left to right, the parameters of Equation 2 represent respectively UL Path Loss 1014, UL UE TX Power 1028, UL UE Ant Gain 1022, and UL gNB Ant Gain 1008 of FIG. 6.

FIG. 6 also depicts Known Value @ UE 1016, and Unknown Value @ UE 1018.

Assuming channel reciprocity the DL path loss 1012 and the UL path loss 1014 are equal and thus the above equations reduce to:

$$UL\_RSRP = DL\_RSRP + gNB\_Ant\_Delta\_Gain - DL\_gNB\_Power + UL\_UE\_Power + UE\_Ant\_Delta\_Gain \quad \text{(Equation 3)}$$

where:

$$gNB\_Ant\_Delta\_Gain = UL\_gNB\_Ant\_Gain - DL\_gNB\_Ant\_Gain \quad \text{(Equation 4)}$$

$$UE\_Ant\_Delta\_Gain = UL\_UE\_Ant\_Gain - DL\_UE\_Ant\_Gain \quad \text{(Equation 5)}$$

The UE 110-1 may now choose to adjust UL beam configuration and potentially UL TX power level to satisfy the link budget for both gNBs as long as calculated UL_RSRP>UL_RSRP_Target for each gNB. The term UL_RSRP_Target corresponds to UL RSRP Target 1004 of FIG. 6.

Reading from left to right after the term UL_RSRP, the parameters of Equation 3 represent respectively DL RSRP 1026, gNB Ant UL/DL Delta Gain 1010, DL gNB TX Power 1002, UL UE TX Power 1028, and UE Ant UL/DL Delta Gain 1024 of FIG. 6. Reading from left to right, the parameters of Equation 4 represent respectively gNB Ant UL/DL Delta Gain 1010, UL gNB Ant Gain 1008, and DL gNB Ant Gain 1006 of FIG. 6. Reading from left to right, the variables of Equation 5 represent respectively UE Ant UL/DL Delta Gain 1024, UL UE Ant Gain 1022, and DL UE Ant Gain 1020 of FIG. 6.

UE→serving gNB: the UE 110-1 reports updated SRS configuration to the serving gNB 170-3 and continues the multi-RTT measurement flow as depicted in FIG. 4.

Figure 7:
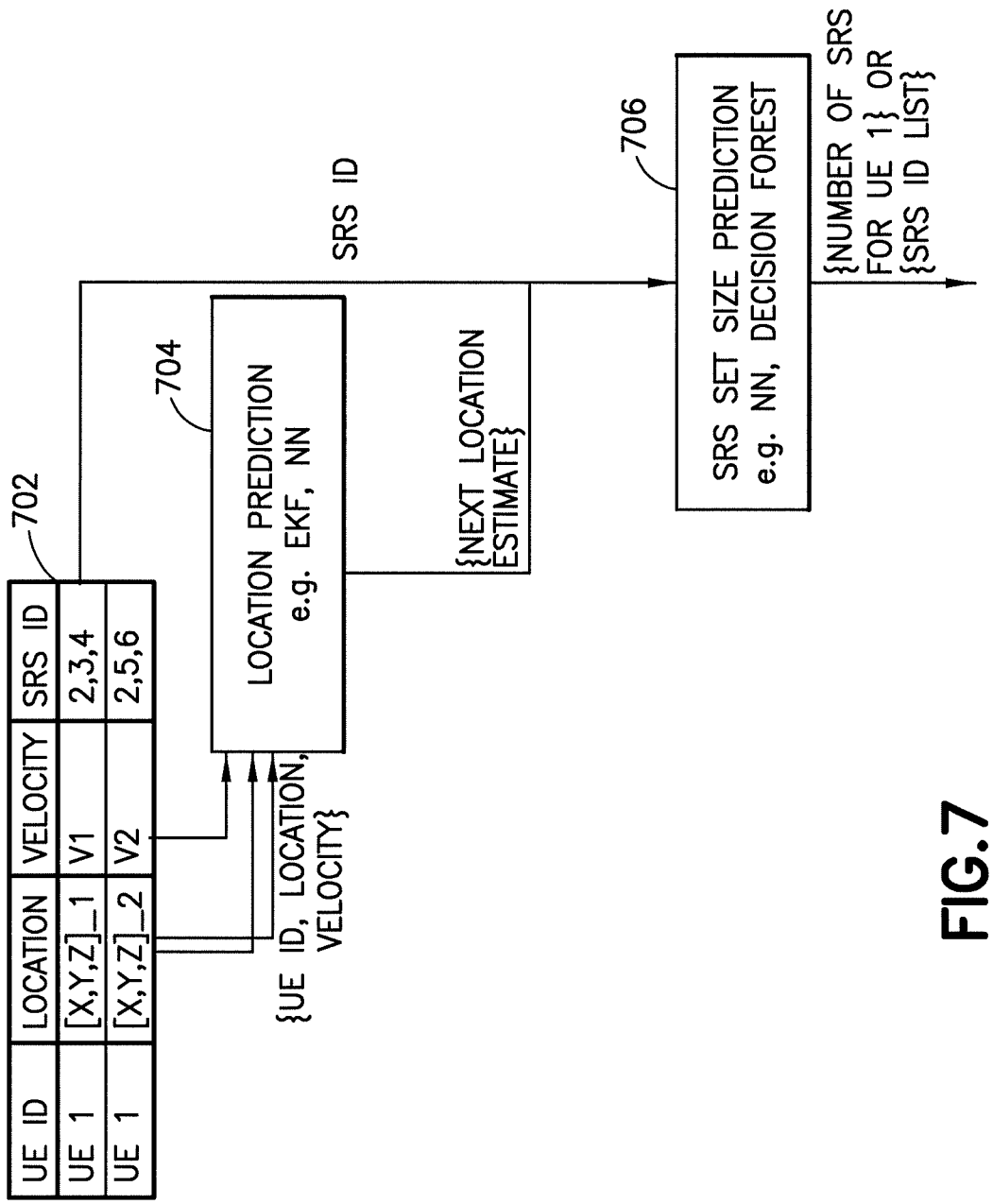
FIG. 7 is a diagram showing an example estimating of the number or IDs of SRS.

FIG. 7 is a diagram showing an example estimating of the number or IDs of SRS. The LMF collects the SRS updated configuration from each UE and after computing the UE location, it populates a table like below (a portion of which is shown as table 702 of FIG. 7):

| UE ID | location | velocity | SRS ID |
|---|---|---|---|
| UE 1 | [x, y, z]_1 | V1 | 2, 3, 4 |
| UE 1 | [x, y, z]_2 | V2 | 2, 5, 6 |
| ... | ... | ... | ... |
| UE P | [x, y, z]_p | vp | 1, 3, 10 |

For each UE (in the above table there are P UEs), the LMF may subsequently use a location prediction algorithm 704 using parameters such as location, velocity, and/or SRS and estimate a future UE location (refer to "Next location estimate" of FIG. 7). Parameters other than location, velocity, and SRS may be used by the location prediction algorithm, e.g., SINR, orientation angle, UE form factor, channel estimates, etc. such that the list of parameters mentioned here is non-exhaustive. The LMF may use this estimate of the future UE location to then predict 706 the number of SRS that the UE may require.

An embodiment of such method is depicted in FIG. 7. The location predictor 704 can be implemented by e.g. means of extended Kalman filtering (EKF) or neural networks (NN), while the SRS set size predictor 706 can be implemented as e.g. a NN or a decision forest. Alternatively, or additionally, the later predictor can output a list of SRS IDs that the UE may use (as "SRS ID list" shown in FIG. 7).

Figure 8:
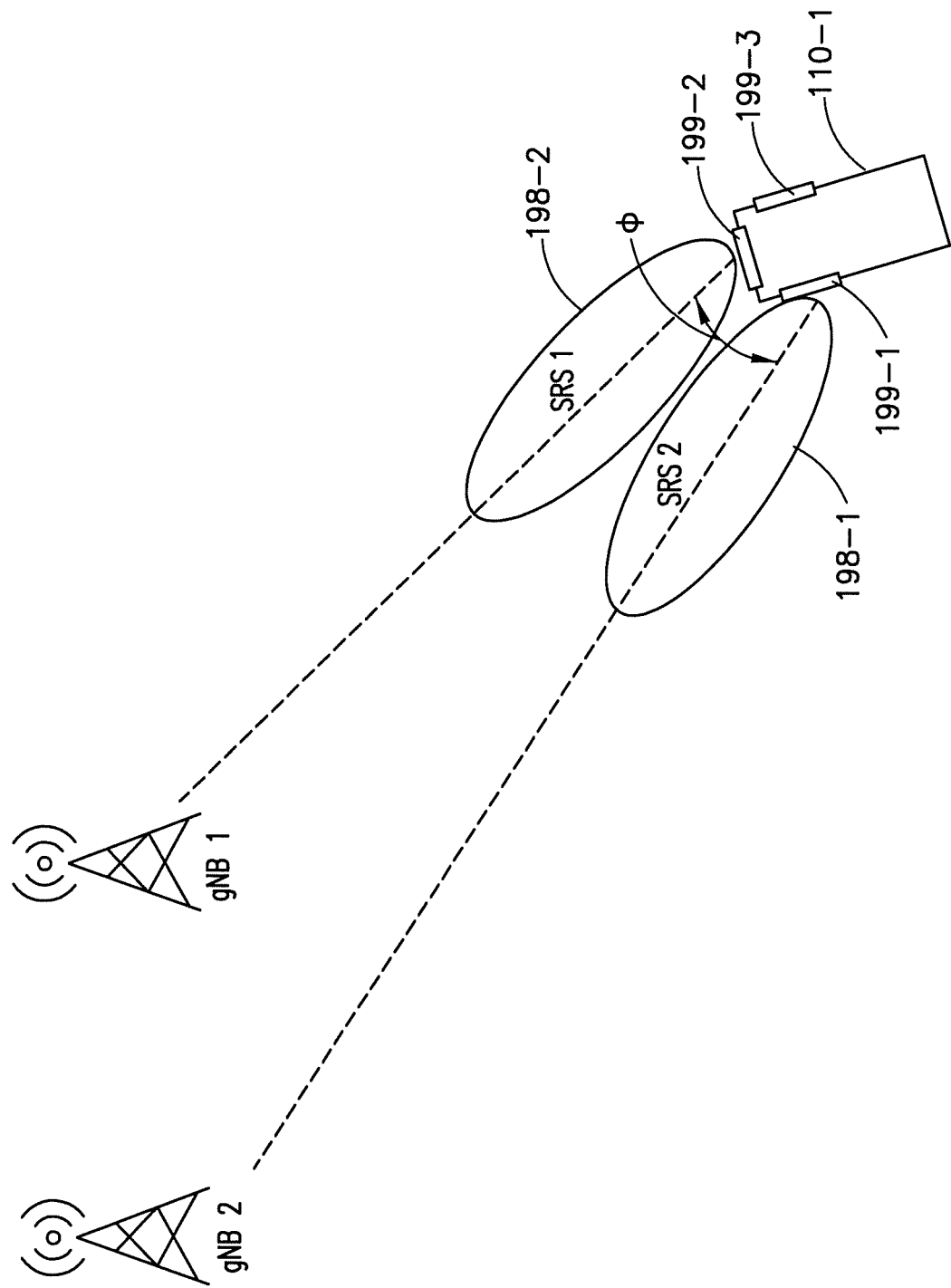
FIG. 8 is an illustration showing a UE Panel selection example for UL SRS transmission.

For a multi-panel UE, during the scan of DL PRS, the UE may scan its antenna panels during the process. FIG. 8 is an illustration showing a UE Panel selection example for UL SRS transmission. In FIG. 8, the antenna panels of the UE 110-1 are shown as items 199-1, 199-2, and 199-3. For many cases the panel on one side of the UE, such as panel 199-1, is having similar performance as the panel on the adjacent side of the UE, such as panel 199-2. Thus, combining the UL SRS transmissions may help reduce the number of UL SRS further. This is illustrated in FIG. 8.

In the example shown by FIG. 8, the UE 110-1 may use two different panels, namely panel 199-1 and panel 199-2, for the UL SRS transmission. The angle between the SRS boresight direction, φ, is rather small and a single UL SRS, rather than each of SRS 1 and SRS 2, would have been sufficient to cover both gNBs, gNB 1 and gNB 2.

Therefore, if the angle between two DL transmissions is below a threshold, the UE 110-1 may decide to combine the UL SRS into a single UE panel.

With reference to the example in FIG. 8 two scenarios may occur:

In a first scenario, the UE panel beams (beam 198-1 and beam 198-2) are partly overlapping and the DL PRS from both gNBs are received by both UE antenna panels 199-1 and 199-2. In this case the UE 110-1 does not have to adjust UL beam width or steering angle but can decide to select the antenna panel with highest DL RSRP for UL SRS transmission and only use 1 SRS for both gNBs. The UE RX-TX reporting may use the panel for SRS transmission as the reference (i.e. use DL PRS TOA from that panel).

In a second scenario, while the angle is small at the UE 110-1, the panel beams are not overlapping so the DL PRS from gNB1 and gNB2 are received only on UE panel 199-1 and 199-2, respectively. The UE 110-1 can now, based on the angle being less than a threshold and a link budget evaluation decide to broaden the UL beam width, and optionally tilt, the beam (such as beam 198-1) on one antenna panel to cover both gNBs and thereby transmit only one SRS to both gNBs. In this case one DL PRS TOA may be from the panel not used in UL (such as panel 199-2) but since the beams are steered in a similar direction the delta distance is small. This scenario is most likely when the UE uses narrow beams to uphold the DL budget. As such a broadening of the UL beam may only be possible if the gNB is providing higher UL gain compared to DL. This may be signaled in the earlier described assistance information.

The main advantages and technical effects of the methods described herein are resource overhead reduction, complexity reduction, reduced interference, and UE power saving. The described method allows a UE to transmit fewer SRS-P resources to complete the multi-RTT procedure by determining wasted overhead and signaling to the network. This reduction in SRS-P resources makes the method less complex from the network perspective, as well as enables a configuration such that less resources need to be reserved. The UE is also to save power by needing to transmit less SRS-P. These advantages and technical effects come without a decrease in positioning accuracy as the same cells are able to measure RTT.

Figure 9:
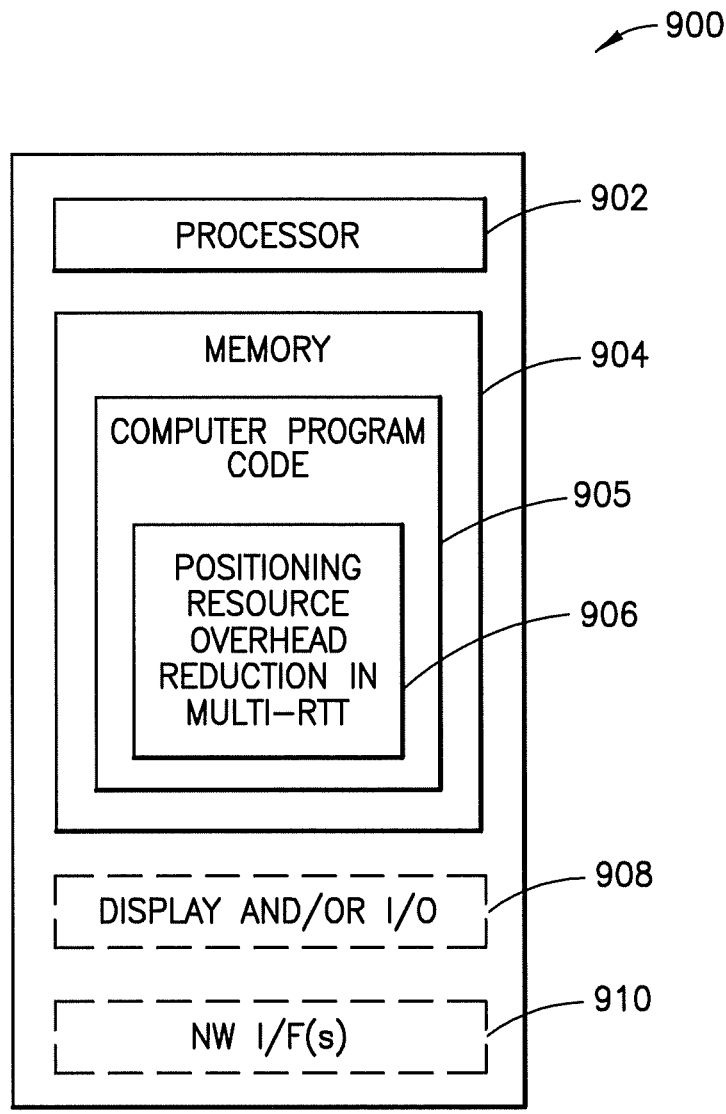
FIG. 9 is an example apparatus configured to implement SRS for positioning resource overhead reduction in multi-RTT, based on the examples described herein.

FIG. 9 is an example apparatus 900, which may be implemented in hardware, configured to implement SRS for positioning resource overhead reduction in multi-RTT, based on the examples described herein. The apparatus 900 comprises a processor 902, at least one non-transitory memory 904 including computer program code 905, wherein the at least one memory 904 and the computer program code 905 are configured to, with the at least one processor 902, cause the apparatus to implement a process, component, module, or function (collectively 906) to implement SRS for positioning resource overhead reduction in multi-RTT. The apparatus 900 optionally includes a display and/or I/O interface 908 that may be used to display aspects or a status of the method described herein (e.g., as the method is being performed or at a subsequent time). The apparatus 900 includes one or more network (NW) interfaces (I/F(s)) 910. The NW I/F(s) 910 may be wired and/or wireless and communicate over the Internet/other network(s) via any communication technique. The NW I/F(s) 910 may comprise one or more transmitters and one or more receivers.

The apparatus 900 may be UE 110, RAN node 170, or Network Element(s) 190. Thus, processor 902 may correspond to processor(s) 120, processor(s) 152, or processor(s) 175, memory 904 may correspond to memory(ies) 125, memory(ies) 155, or memory(ies) 171, computer program code 905 may correspond to computer program code 123, module 140-1, module 140-2, computer program code 153, module 150-1, module 150-2, or computer program code 173, and NW I/F(s) 910 may correspond to N/W I/F(s) 161 or N/W I/F(s) 180. Alternatively, apparatus 900 may not correspond to either of UE 110, RAN node 170, or Network element(s) 190 (for example, apparatus 900 may be a remote or a cloud apparatus).

It will also be appreciated that throughout this description, reference numbers 110-"x", 170-"x", and 190-"x" correspond to the actual items or variations of the items of FIG. 1, including UE 110, RAN node 170, and Network Element(s) 190. As an example, LMF 190-1 of FIG. 4 may be or implement functionality of the Network Element(s) 190 of FIG. 1.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 10:
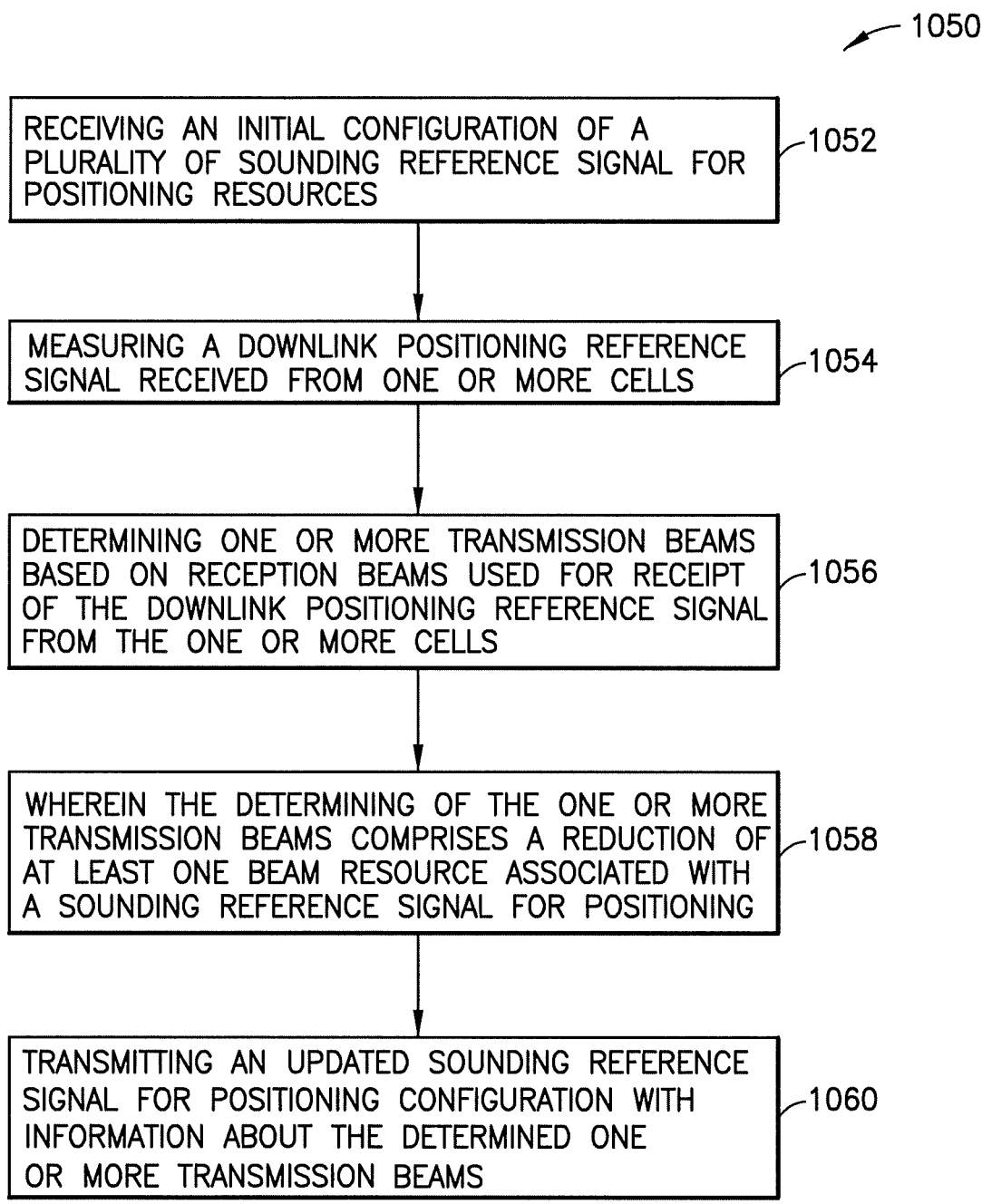
FIG. 10 shows an example method for SRS for positioning resource overhead reduction in multi-RTT, based on the examples described herein.

FIG. 10 is an example method 1050 for implementing SRS for positioning resource overhead reduction in multi-RTT, based on the example embodiments described herein. At 1052, the method includes receiving an initial configuration of a plurality of sounding reference signal for positioning resources. At 1054, the method includes measuring a downlink positioning reference signal received from one or more cells. At 1056, the method includes determining one or more transmission beams based on reception beams used for receipt of the downlink positioning reference signal from the one or more cells. At 1058, the method includes wherein the determining of the one or more transmission beams comprises a reduction of at least one beam resource associated with a sounding reference signal for positioning. At 1060, the method includes transmitting an updated sounding reference signal for positioning configuration with information about the determined one or more transmission beams. The method 1000 may be performed by a user equipment, such as UE 110 of FIG. 1. While the method 1050 references an SRS, the method 1000 could apply to any UL reference signal used for positioning. This is true for the methods described herein generally.

Figure 11:
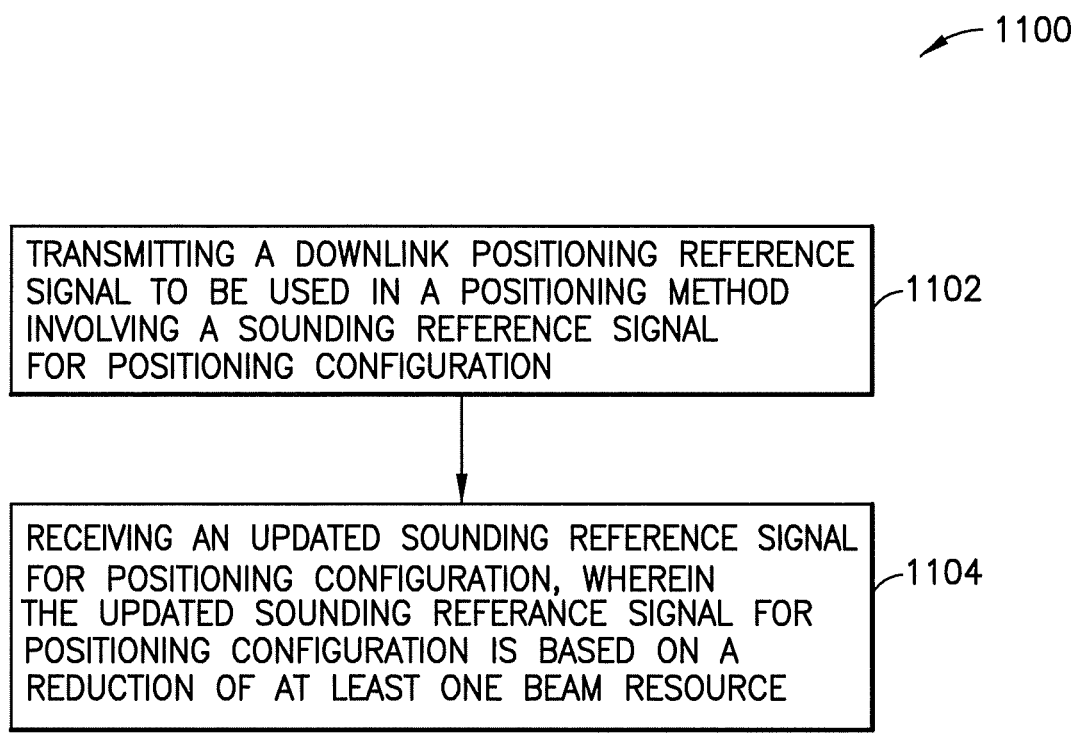
FIG. 11 shows another example method for SRS for positioning resource overhead reduction in multi-RTT, based on the examples described herein.

FIG. 11 is another example method 1100 for implementing SRS for positioning resource overhead reduction in multi-RTT, based on the example embodiments described herein. At 1102, the method includes transmitting a downlink positioning reference signal to be used in a positioning method involving a sounding reference signal for positioning configuration. At 1104, the method includes receiving an updated sounding reference signal for positioning configuration, wherein the updated sounding reference signal for positioning configuration is based on a reduction of at least one beam resource. The method 1100 may be performed by a radio node, such as RAN node 170 of FIG. 1.

Figure 12:
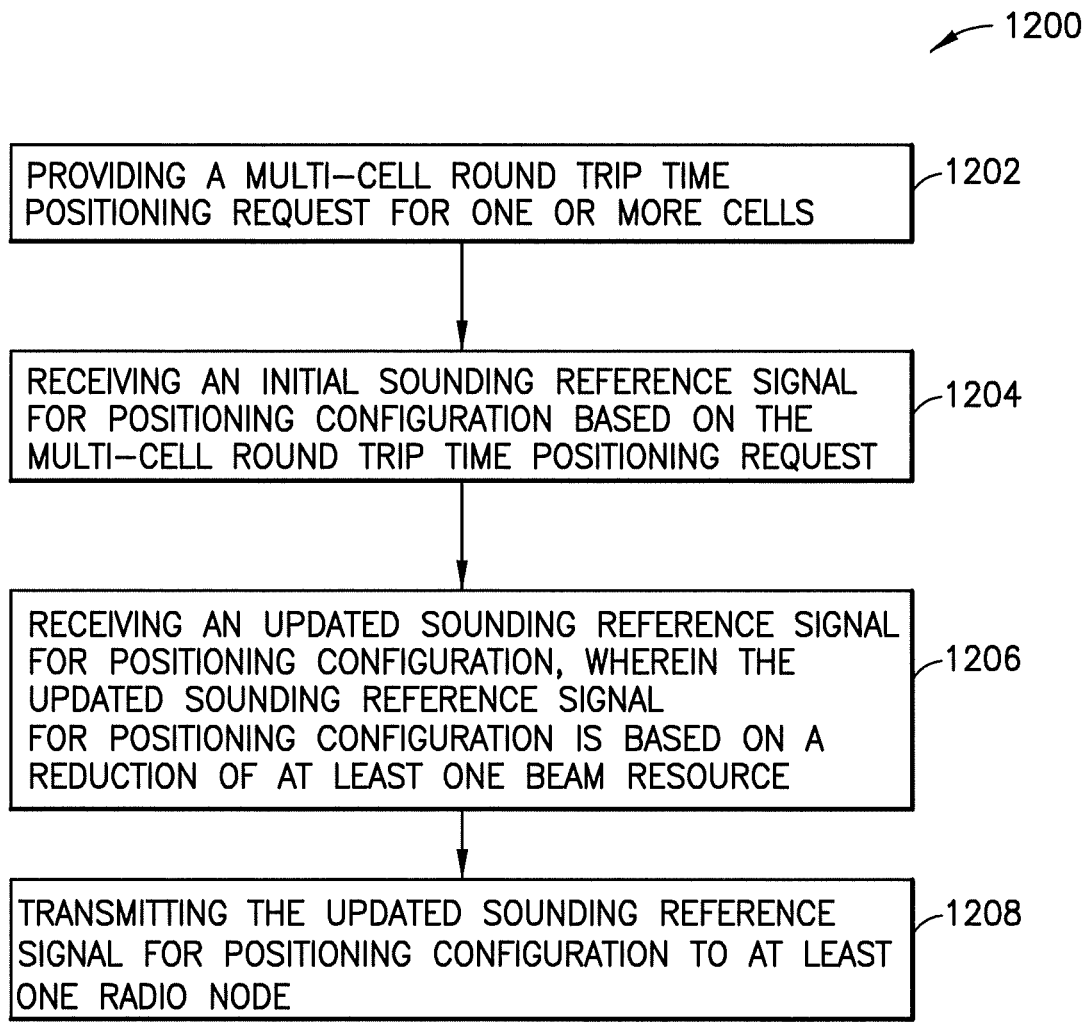
FIG. 12 shows another example method for SRS for positioning resource overhead reduction in multi-RTT, based on the examples described herein.

FIG. 12 is another example method 1200 for implementing SRS for positioning resource overhead reduction in multi-RTT, based on the example embodiments described herein. At 1202, the method includes providing a multi-cell round trip time positioning request for one or more cells. At 1204, the method includes receiving an initial sounding reference signal for positioning configuration based on the multi-cell round trip time positioning request. At 1206, the method includes receiving an updated sounding reference signal for positioning configuration, wherein the updated sounding reference signal for positioning configuration is based on a reduction of at least one beam resource. At 1208, the method includes transmitting the updated sounding reference signal for positioning configuration to at least one radio node. The method 1200 may be performed by a location management function of a network element, such as network element 190 of FIG. 1. The method 1200 may also be performed by a radio node, such as the RAN node 170 of FIG. 1.

An example method includes receiving an initial configuration of a plurality of sounding reference signal for positioning resources; measuring a downlink positioning reference signal received from one or more cells; determining one or more transmission beams based on reception beams used for receipt of the downlink positioning reference signal from the one or more cells; wherein the determining of the one or more transmission beams comprises a reduction of at least one beam resource associated with a sounding reference signal for positioning; and transmitting an updated sounding reference signal for positioning configuration with information about the determined one or more transmission beams.

The method may further include wherein the determining of the one or more beams comprises identifying a common transmission beam for multiple cells, representing an overlap of beams.

The method may further include wherein the determining of the one or more beams comprises identifying an overlap of beams in a spatial domain.

The method may further include wherein the determining comprises using uplink beams or beam widths different than for reception of the downlink positioning reference signal.

The method may further include receiving assistance information comprising parameters for use in a link budget calculation for use in the determining of the one or more transmission beams; and calculating a link budget based on the received assistance information parameters; wherein the determining of the one or more transmission beams involves determining an overlap of beams.

The method may further include wherein the calculation is based on at least one of: a beamforming gain for downlink positioning reference signal resources; a steering angle; a received power of the downlink positioning reference signal; a received minimum requested received power; or local knowledge of the minimum requested received power.

The method may further include wherein the assistance information is received from at least one of: a base station or a location management function.

The method may further include scanning a plurality of antenna panels to identify whether it is possible to use a shared beam for multiple target cells; and combining uplink sounding reference signal resources into a single antenna panel in response to an angle between at least two uplink transmissions being below a threshold.

The method may further include wherein the determining comprises adjusting an uplink beam configuration and uplink power level to satisfy a link budget in response to a calculated uplink reference signal received power being greater than a target uplink reference signal received power for at least one of the one or more cells.

The method may further include wherein the reduction of at least one beam resource comprises broadening or tilting at least one beam to eliminate a need to use a sounding reference signal for positioning resource.

An example method includes transmitting a downlink positioning reference signal to be used in a positioning method involving a sounding reference signal for positioning configuration; and receiving an updated sounding reference signal for positioning configuration, wherein the updated sounding reference signal for positioning configuration is based on a reduction of at least one beam resource.

The method may further include receiving and providing a multi-cell round trip time positioning request for one or more cells; providing an initial sounding reference signal for positioning configuration; and transmitting the updated sounding reference signal for positioning configuration to a neighboring radio node and/or a location management function.

The method may further include providing assistance information comprising parameters for use in a link budget calculation for use in a determination of the reduction of the at least one beam resource.

The method may further include wherein the assistance information comprises at least one of: a radio node downlink power; a radio node UL/DL delta antenna gain; or a minimum target uplink reference signal received power.

The method may further include receiving an initial sounding reference signal for positioning configuration.

An example method includes providing a multi-cell round trip time positioning request for one or more cells; receiving an initial sounding reference signal for positioning configuration based on the multi-cell round trip time positioning request; receiving an updated sounding reference signal for positioning configuration, wherein the updated sounding reference signal for positioning configuration is based on a reduction of at least one beam resource; and transmitting the updated sounding reference signal for positioning configuration to at least one radio node.

The method may further include tracking a number of sounding reference signal for positioning resources needed, based on at least one of a location, mobility, or trajectory of a user equipment for use configuring a number of needed sounding reference signal for positioning resources.

The method may further include using a location prediction algorithm to estimate a future location of a user equipment; and predicting a number of sounding reference signal for positioning resources the user equipment may require, based on the predicted future location.

The method may further include wherein the predicting comprises outputting a list of sounding reference signal for positioning identifiers that the user equipment may use.

The method may further include providing a minimum requested received power for a user equipment as a threshold to determine if a link budget is sufficient.

An example apparatus includes at least one processor; and at least one non-transitory memory including computer program code; wherein the at least one memory and the computer program code are configured to, with the at least one processor, cause the apparatus at least to perform: receive an initial configuration of a plurality of sounding reference signal for positioning resources; measure a downlink positioning reference signal received from one or more cells; determine one or more transmission beams based on reception beams used for receipt of the downlink positioning reference signal from the one or more cells; wherein the determining of the one or more transmission beams comprises a reduction of at least one beam resource associated with a sounding reference signal for positioning; and transmit an updated sounding reference signal for positioning configuration with information about the determined one or more transmission beams.

The apparatus may further include wherein the determining of the one or more beams comprises identifying a common transmission beam for multiple cells, representing an overlap of beams.

The apparatus may further include wherein the determining of the one or more beams comprises identifying an overlap of beams in a spatial domain.

The apparatus may further include wherein the determining comprises using uplink beams or beam widths different than for reception of the downlink positioning reference signal.

The apparatus may further include wherein the at least one memory and the computer program code are further configured to, with the at least one processor, cause the apparatus at least to perform: receive assistance information comprising parameters for use in a link budget calculation for use in the determining of the one or more transmission beams; and calculate a link budget based on the received assistance information parameters; wherein the determining of the one or more transmission beams involves determining an overlap of beams.

The apparatus may further include wherein the calculation is based on at least one of: a beamforming gain for downlink positioning reference signal resources; a steering angle; a received power of the downlink positioning reference signal; a received minimum requested received power; or local knowledge of the minimum requested received power.

The apparatus may further include wherein the assistance information is received from at least one of: a base station or a location management function.

The apparatus may further include wherein the at least one memory and the computer program code are further configured to, with the at least one processor, cause the apparatus at least to perform: scan a plurality of antenna panels to identify whether it is possible to use a shared beam for multiple target cells; and combine uplink sounding reference signal resources into a single antenna panel in response to an angle between at least two uplink transmissions being below a threshold.

The apparatus may further include wherein the determining comprises adjusting an uplink beam configuration and uplink power level to satisfy a link budget in response to a calculated uplink reference signal received power being greater than a target uplink reference signal received power for at least one of the one or more cells.

The apparatus may further include wherein the reduction of at least one beam resource comprises broadening or tilting at least one beam to eliminate a need to use a sounding reference signal for positioning resource.

An example apparatus includes at least one processor; and at least one non-transitory memory including computer program code; wherein the at least one memory and the computer program code are configured to, with the at least one processor, cause the apparatus at least to perform: transmit a downlink positioning reference signal to be used in a positioning method involving a sounding reference signal for positioning configuration; and receive an updated sounding reference signal for positioning configuration, wherein the updated sounding reference signal for positioning configuration is based on a reduction of at least one beam resource.

The apparatus may further include wherein the at least one memory and the computer program code are further configured to, with the at least one processor, cause the apparatus at least to perform: receive and provide a multi-cell round trip time positioning request for one or more cells; provide an initial sounding reference signal for positioning configuration; and transmit the updated sounding reference signal for positioning configuration to a neighboring radio node and/or a location management function.

The apparatus may further include wherein the at least one memory and the computer program code are further configured to, with the at least one processor, cause the apparatus at least to perform: provide assistance information comprising parameters for use in a link budget calculation for use in a determination of the reduction of the at least one beam resource.

The apparatus may further include wherein the assistance information comprises at least one of: a radio node downlink power; a radio node UL/DL delta antenna gain; or a minimum target uplink reference signal received power.

The apparatus may further include wherein the at least one memory and the computer program code are further configured to, with the at least one processor, cause the apparatus at least to perform: receive an initial sounding reference signal for positioning configuration.

An example apparatus includes at least one processor; and at least one non-transitory memory including computer program code; wherein the at least one memory and the computer program code are configured to, with the at least one processor, cause the apparatus at least to perform: provide a multi-cell round trip time positioning request for one or more cells; receive an initial sounding reference signal configuration for positioning based on the multi-cell round trip time positioning request; receive an updated sounding reference signal for positioning configuration, wherein the updated sounding reference signal for positioning configuration is based on a reduction of at least one beam resource; and transmit the updated sounding reference signal for positioning configuration to at least one radio node.

The apparatus may further include wherein the at least one memory and the computer program code are further configured to, with the at least one processor, cause the apparatus at least to perform: track a number of sounding reference signal for positioning resources needed, based on at least one of a location, mobility, or trajectory of a user equipment for use configuring a number of needed sounding reference signal for positioning resources.

The apparatus may further include wherein the at least one memory and the computer program code are further configured to, with the at least one processor, cause the apparatus at least to perform: use a location prediction algorithm to estimate a future location of a user equipment; and predict a number of sounding reference signal for positioning resources the user equipment may require, based on the predicted future location.

The apparatus may further include wherein the predicting comprises outputting a list of sounding reference signal for positioning identifiers that the user equipment may use.

The apparatus may further include wherein the at least one memory and the computer program code are further configured to, with the at least one processor, cause the apparatus at least to perform: provide a minimum requested received power for a user equipment as a threshold to determine if a link budget is sufficient.

An example non-transitory program storage device readable by a machine, tangibly embodying a program of instructions executable by the machine for performing operations is provided, the operations comprising: receiving an initial configuration of a plurality of sounding reference signal for positioning resources; measuring a downlink positioning reference signal received from one or more cells; determining one or more transmission beams based on reception beams used for receipt of the downlink positioning reference signal from the one or more cells; wherein the determining of the one or more transmission beams comprises a reduction of at least one beam resource associated with a sounding reference signal for positioning; and transmitting an updated sounding reference signal for positioning configuration with information about the determined one or more transmission beams.

The non-transitory program storage device may further include wherein the determining of the one or more beams comprises identifying a common transmission beam for multiple cells, representing an overlap of beams.

The non-transitory program storage device may further include wherein the determining of the one or more beams comprises identifying an overlap of beams in a spatial domain.

The non-transitory program storage device may further include wherein the determining comprises using uplink beams or beam widths different than for reception of the downlink positioning reference signal.

The non-transitory program storage device may further include wherein the operations further comprise: receiving assistance information comprising parameters for use in a link budget calculation for use in the determining of the one or more transmission beams; and calculating a link budget based on the received assistance information parameters; wherein the determining of the one or more transmission beams involves determining an overlap of beams.

The non-transitory program storage device may further include wherein the calculation is based on at least one of: a beamforming gain for downlink positioning reference signal resources; a steering angle; a received power of the downlink positioning reference signal; a received minimum requested received power; or local knowledge of the minimum requested received power.

The non-transitory program storage device may further include wherein the assistance information is received from at least one of: a base station or a location management function.

The non-transitory program storage device may further include wherein the operations further comprise: scanning a plurality of antenna panels to identify whether it is possible to use a shared beam for multiple target cells; and combining uplink sounding reference signal resources into a single antenna panel in response to an angle between at least two uplink transmissions being below a threshold.

The non-transitory program storage device may further include wherein the determining comprises adjusting an uplink beam configuration and uplink power level to satisfy a link budget in response to a calculated uplink reference signal received power being greater than a target uplink reference signal received power for at least one of the one or more cells.

The non-transitory program storage device may further include wherein the reduction of at least one beam resource comprises broadening or tilting at least one beam to eliminate a need to use a sounding reference signal for positioning resource.

An example non-transitory program storage device readable by a machine, tangibly embodying a program of instructions executable by the machine for performing operations is provided, the operations comprising: transmitting a downlink positioning reference signal to be used in a positioning method involving a sounding reference signal for positioning configuration; and receiving an updated sounding reference signal for positioning configuration, wherein the updated sounding reference signal for positioning configuration is based on a reduction of at least one beam resource.

The non-transitory program storage device may further include wherein the operations further comprise: receiving and providing a multi-cell round trip time positioning request for one or more cells; providing an initial sounding reference signal for positioning configuration; and transmitting the updated sounding reference signal for positioning configuration to a neighboring radio node and/or a location management function.

The non-transitory program storage device may further include wherein the operations further comprise providing assistance information comprising parameters for use in a link budget calculation for use in a determination of the reduction of the at least one beam resource.

The non-transitory program storage device may further include wherein the assistance information comprises at least one of: a radio node downlink power; a radio node UL/DL delta antenna gain; or a minimum target uplink reference signal received power.

The non-transitory program storage device may further include wherein the operations further comprise receiving an initial sounding reference signal for positioning configuration.

An example non-transitory program storage device readable by a machine, tangibly embodying a program of instructions executable by the machine for performing operations is provided, the operations comprising: providing a multi-cell round trip time positioning request for one or more cells; receiving an initial sounding reference signal for positioning configuration based on the multi-cell round trip time positioning request; receiving an updated sounding reference signal for positioning configuration, wherein the updated sounding reference signal for positioning configuration is based on a reduction of at least one beam resource; and transmitting the updated sounding reference signal for positioning configuration to at least one radio node.

The non-transitory program storage device may further include wherein the operations further comprise tracking a number of sounding reference signal for positioning resources needed, based on at least one of a location, mobility, or trajectory of a user equipment for use configuring a number of needed sounding reference signal for positioning resources.

The non-transitory program storage device may further include wherein the operations further comprise: using a location prediction algorithm to estimate a future location of a user equipment; and predicting a number of sounding reference signal for positioning resources the user equipment may require, based on the predicted future location.

The non-transitory program storage device may further include wherein the predicting comprises outputting a list of sounding reference signal for positioning identifiers that the user equipment may use.

The non-transitory program storage device may further include wherein the operations further comprise providing a minimum requested received power for a user equipment as a threshold to determine if a link budget is sufficient.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   receiving an initial configuration of a plurality of sounding reference signal for positioning resources;
   measuring a downlink positioning reference signal received from one or more cells;
   determining one or more transmission beams based on reception beams used for receipt of the downlink positioning reference signal from the one or more cells;
   wherein the determining of the one or more transmission beams comprises a reduction of at least one beam resource associated with a sounding reference signal for positioning;
   scanning a plurality of antenna panels to identify whether it is possible to use a shared beam for multiple target cells;
   combining uplink sounding reference signal resources into a single antenna panel, in response to an angle between at least two uplink transmissions being below a threshold, to reduce the at least one beam resource associated with the sounding reference signal for positioning; and
   transmitting an updated sounding reference signal for positioning configuration with information about the determined one or more transmission beams associated with the reduction of the at least one beam resource associated with the sounding reference signal for positioning.

2. The method of claim 1, wherein the determining of the one or more beams comprises identifying a common transmission beam for multiple cells, representing an overlap of beams.

3. The method of claim 1, wherein the determining of the one or more beams comprises identifying an overlap of beams in a spatial domain.

4. The method of claim 1, wherein the determining comprises using uplink beams or beam widths different than for reception of the downlink positioning reference signal.

5. The method of claim 1, further comprising:
   receiving assistance information comprising parameters for use in a link budget calculation for use in the determining of the one or more transmission beams; and
   calculating a link budget based on the received assistance information parameters;
   wherein the determining of the one or more transmission beams involves determining an overlap of beams.

6. An apparatus comprising:
   at least one processor; and
   at least one non-transitory memory including computer program code;
   wherein the at least one memory and the computer program code are configured to, with the at least one processor, cause the apparatus at least to:
   receive an initial configuration of a plurality of sounding reference signal for positioning resources;
   measure a downlink positioning reference signal received from one or more cells;
   determine one or more transmission beams based on reception beams used for receipt of the downlink positioning reference signal from the one or more cells;
   wherein the determining of the one or more transmission beams comprises a reduction of at least one beam resource associated with a sounding reference signal for positioning;
   scan a plurality of antenna panels to identify whether it is possible to use a shared beam for multiple target cells;
   combine uplink sounding reference signal resources into a single antenna panel, in response to an angle between at least two uplink transmissions being below a threshold, to reduce the at least one beam resource associated with the sounding reference signal for positioning; and
   transmit an updated sounding reference signal for positioning configuration with information about the determined one or more transmission beams associated with the reduction of the at least one beam resource associated with the sounding reference signal for positioning.

7. The apparatus of claim 6, wherein the determining of the one or more beams comprises identifying a common transmission beam for multiple cells, representing an overlap of beams.

8. The apparatus of claim 6, wherein the determining of the one or more beams comprises identifying an overlap of beams in a spatial domain.

9. The apparatus of claim 6, wherein the determining comprises using uplink beams or beam widths different than for reception of the downlink positioning reference signal.

10. The apparatus of claim 6, wherein the at least one memory and the computer program code are further configured to, with the at least one processor, cause the apparatus at least to:
    receive assistance information comprising parameters for use in a link budget calculation for use in the determining of the one or more transmission beams; and
    calculate a link budget based on the received assistance information parameters;
    wherein the determining of the one or more transmission beams involves determining an overlap of beams.

11. The apparatus of claim 10, wherein the calculation is based on at least one of:
    a beamforming gain for downlink positioning reference signal resources;
    a steering angle;
    a received power of the downlink positioning reference signal;
    a received minimum requested received power; or
    local knowledge of the minimum requested received power.

12. The apparatus of claim 10, wherein the assistance information is received from at least one of: a base station or a location management function.

13. The apparatus of claim 6, wherein the determining comprises adjusting an uplink beam configuration and uplink power level to satisfy a link budget in response to a calculated uplink reference signal received power being greater than a target uplink reference signal received power for at least one of the one or more cells.

14. The apparatus of claim 6, wherein the reduction of at least one beam resource comprises broadening or tilting at least one beam to eliminate a need to use a sounding reference signal for positioning resource.

15. A non-transitory program storage device readable by a machine, tangibly embodying a program of instructions executable by the machine for performing operations, the operations comprising:
receiving an initial configuration of a plurality of sounding reference signal for positioning resources;
measuring a downlink positioning reference signal received from one or more cells;
determining one or more transmission beams based on reception beams used for receipt of the downlink positioning reference signal from the one or more cells;
wherein the determining of the one or more transmission beams comprises a reduction of at least one beam resource associated with a sounding reference signal for positioning;
scanning a plurality of antenna panels to identify whether it is possible to use a shared beam for multiple target cells;
combining uplink sounding reference signal resources into a single antenna panel, in response to an angle between at least two uplink transmissions being below a threshold, to reduce the at least one beam resource associated with the sounding reference signal for positioning; and
transmitting an updated sounding reference signal for positioning configuration with information about the determined one or more transmission beams associated with the reduction of the at least one beam resource associated with the sounding reference signal for positioning.

16. The non-transitory program storage device of claim 15, wherein the determining of the one or more beams comprises identifying a common transmission beam for multiple cells, representing an overlap of beams.

17. The non-transitory program storage device of claim 15, wherein the determining of the one or more beams comprises identifying an overlap of beams in a spatial domain.

18. The non-transitory program storage device of claim 15, wherein the determining comprises using uplink beams or beam widths different than for reception of the downlink positioning reference signal.

19. The non-transitory program storage device of claim 15, the operations further comprising:
receiving assistance information comprising parameters for use in a link budget calculation for use in the determining of the one or more transmission beams; and
calculating a link budget based on the received assistance information parameters;
wherein the determining of the one or more transmission beams involves determining an overlap of beams.

* * * * *